United States Patent
Koste et al.

(10) Patent No.: US 8,327,710 B2
(45) Date of Patent: Dec. 11, 2012

(54) SYSTEM FOR ESTIMATING A CONDITION OF NON-CONDUCTIVE HOLLOW STRUCTURE EXPOSED TO A LIGHTNING STRIKE

(75) Inventors: Glen Peter Koste, Niskayuna, NY (US); Boon Lee, Niskayuna, NY (US); Robert Murray, Niskayuna, NY (US); Yaru Mendez Hernandez, Bavaria, DE (US); Paul Judge, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 146 days.

(21) Appl. No.: 12/846,099

(22) Filed: Jul. 29, 2010

(65) Prior Publication Data

US 2011/0265575 A1    Nov. 3, 2011

(51) Int. Cl.
*G01H 1/00* (2006.01)
*G01M 17/00* (2006.01)

(52) U.S. Cl. ............... 73/660; 73/170.24; 416/61
(58) Field of Classification Search ............ 73/660, 73/147, 170.24, 865.8; 416/61; 290/44
See application file for complete search history.

(56) References Cited

U.S. PATENT DOCUMENTS

| | | | | |
|---|---|---|---|---|
| 4,625,559 A * | 12/1986 | Carter et al. | ............. | 73/706 |
| 6,741,069 B1 | 5/2004 | Klemar et al. | | |
| 7,379,169 B1 | 5/2008 | Kraemer | | |
| 7,400,054 B2 * | 7/2008 | Wesselink | ............. | 290/44 |
| 7,806,657 B2 * | 10/2010 | Schram et al. | ............. | 416/61 |
| 7,883,319 B2 * | 2/2011 | Volkmer | ............. | 416/61 |
| 8,005,617 B2 * | 8/2011 | Koste et al. | ............. | 702/4 |
| 2007/0041834 A1 | 2/2007 | Schram et al. | | |
| 2008/0017788 A1 | 1/2008 | Kraemer | | |
| 2009/0236853 A1 | 9/2009 | Kraemer | | |
| 2009/0237272 A1 | 9/2009 | Georgeson | | |
| 2009/0311096 A1 * | 12/2009 | Herr et al. | ............. | 416/42 |
| 2010/0281987 A1 * | 11/2010 | Buschnakowski et al. | ..... | 73/658 |
| 2011/0246094 A1 * | 10/2011 | Olesen | ............. | 702/34 |
| 2012/0024071 A1 * | 2/2012 | Herrig et al. | ............. | 73/717 |
| 2012/0025804 A1 * | 2/2012 | Brnada | ............. | 324/72 |

FOREIGN PATENT DOCUMENTS

| | | |
|---|---|---|
| EP | 2151575 A1 | 10/2010 |
| JP | 2004324631 A | 11/2004 |
| JP | 2009203893 A | 9/2009 |
| JP | 2008025993 A | 10/2009 |
| WO | 2008065196 A2 | 6/2008 |
| WO | 2009068034 A1 | 4/2009 |
| WO | 2009083006 A1 | 7/2009 |
| WO | 2009109760 A2 | 9/2009 |
| WO | WO2010097485 * | 9/2010 |

OTHER PUBLICATIONS

Sebastian G.M. Kramer et al, Lightning impact monitoring system for wind turbines, 6 pages. http://www.ewec2007proceedings.info/allfiles2/58_Ewec2007fullpaper.pdf.

* cited by examiner

*Primary Examiner* — J M Saint Surin
(74) *Attorney, Agent, or Firm* — Ann M. Agosti (57) ABSTRACT

A system is provided for estimating a condition of a non-conductive hollow structure exposed to a lightning strike. The structure has an internal cavity. The system includes a pressure transducer to measure a pressure of an acoustic wave generated within the internal cavity due to the lightning strike. The system further includes a controller coupled to the pressure transducer, to receive the measured pressure from the pressure transducer, and to process the condition of the structure, based on the measured pressure.

20 Claims, 7 Drawing Sheets

SYSTEM FOR ESTIMATING A CONDITION OF NON-CONDUCTIVE HOLLOW STRUCTURE EXPOSED TO A LIGHTNING STRIKE

BACKGROUND

The invention relates generally to non-conductive hollow structures, and more particularly, to a system for estimating a condition of a non-conductive hollow structure exposed to a lightning strike.

Wind turbine blades have become increasingly susceptible to lightning strikes, as the rated electric power of the wind turbines and the dimensions of the wind turbine blades have increased. The condition of a wind turbine blade exposed to a lightning strike can be adversely affected. This can result in reduced power output, as it requires long down time to repair and/or replace the affected blade.

Conventional systems have been proposed to protect wind turbine blades from adverse condition effects due to lightning strikes. In such systems, wind turbine blades are equipped with a metal receptor at a tip of the blade and a down-conductor is installed within the interior of the blade, to electrically couple the metal receptor to an earth ground. Other designs of conventional down-conductor systems may include external meshes or external conductors, for example. In the event of a lightning strike to the metal receptor at the blade tip, the conductor passes a lightning current from the blade tip to the earth ground, in an effort to prevent the lightning current from causing adverse condition effects to the turbine blade.

However, such conventional systems may have several drawbacks. For example, not all lightning strikes to the wind turbine blade occur at the blade tip. Instead, the lightning may strike the wind turbine blade at an intermediate location between the root and the tip of the blade, with the potential to cause adverse effects on the condition of the turbine blade. Indeed, it would be advantageous to provide a system to estimate the condition of a wind turbine blade exposed to a lightning strike and/or to provide an estimate of the condition of the wind turbine blade resulting from the lightning strike.

BRIEF DESCRIPTION

In accordance with an example embodiment, a system is provided for estimating a condition of a non-conductive hollow structure exposed to a lightning strike. The structure has an internal cavity. The system includes a pressure transducer to measure a pressure of an acoustic wave generated within the internal cavity due to the lightning strike. The system further includes a controller coupled to the pressure transducer, to receive the measured pressure from the pressure transducer, and to process the condition of the structure, based on the measured pressure.

In accordance with another example embodiment disclosed herein, a system is provided for monitoring a condition of a plurality of wind turbine blades exposed to a lightning strike affecting at least one of the turbine blades. Each turbine blade has a root and a tip at opposing ends along a longitudinal axis. The turbine blades are connected to a hub at the respective root. The system includes a pressure transducer to measure a pressure of an acoustic wave generated within the internal cavity due to the lightning strike. Additionally, the system includes a controller coupled to each pressure transducer, to receive the measured pressure from each pressure transducer and to monitor the condition of each turbine blade, based on comparing the measured pressure from each turbine blade with a pressure threshold indicative of the lightning strike.

In accordance with another example embodiment disclosed herein, a system is provided for estimating a condition of a non-conductive hollow structure exposed to a lightning strike. The structure has an internal cavity. The system includes a pressure transducer to measure a pressure of an acoustic wave generated within the internal cavity due to the lightning strike. The system further includes a conductor to extend along a longitudinal axis of the structure, to pass a current attributable to the lightning strike. The system further includes a current sensor coupled to the conductor, to measure the current within the conductor. The system further includes a controller coupled to the pressure transducer and the current sensor, to receive the measured pressure from the pressure transducer and the measured current from the current sensor, and to process the condition of the structure, based on the measured pressure and the measured current.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Example embodiments of the invention are described in the context of turbine blades. However, the embodiments of the invention are not limited to these arrangements, and include any electrically non-conductive hollow structure, with a partially enclosed or contained volume, such as a wind turbine blade arrangement and its corresponding lightning protection system, which is exposed to the outside atmosphere, and thus exposed to and susceptible to lightning strikes and increased electric field magnitude during storms. The non-conductive hollow structures may include electrically conductive or non-conductive coating which could be applied to the hollow structure, during the manufacturing process, for example. Such non-conductive hollow structures include, but are not limited to, turbine blades used in a wind turbine system, a hollow structure used to form the wing, fuselage, or tail of an aircraft, and a hollow structure used to form a radome for an antenna, for example. As discussed above, conventional systems have been introduced, which provide a conductor which extends within the turbine blade, from the tip to the root, to pass current from a receptor at the tip to an earth ground, in the event that the turbine blade is struck at the tip receptor by a lightning strike. However, the inventors of the present invention recognized that these conventional systems do not address the circumstance of a lightning strike at locations along the turbine blade, other than at the tip receptor. The inventors of the present invention recognized that, in the event of such a lightning strike, the exterior surface of the turbine blade may break down, including the skin and glue material, resulting in an arc of lightning current through an internal cavity of the turbine blade, which would rapidly heat the air within the internal cavity and cause a pressure shockwave, which may subsequently affect the condition of the turbine blade. The inventors of the present invention recognized that, if a system were installed which could monitor the condition of the turbine blade, preventive measures may be taken to prevent possible further adverse effects to the condition of the turbine blade. Although the conventional systems discussed above provide a conductor which passes current indicative of a lightning strike at a tip receptor, the current does not provide information regarding the condition of the turbine blade. In the embodiments of the present invention, the condition of the turbine blade is determined/monitored, and may or may not indicate that a lightning strike to the turbine blade has adversely affected the turbine blade so to warrant a repair and/or replacement of part or all of the turbine blade. For example, the system may determine that, subsequent to a lightning strike to a turbine blade, that the condition of the turbine blade does not indicate any adverse effect which necessitates a repair to the turbine blade. However, in another example, the system may determine that, subsequent to a lightning strike to the turbine blade, that the condition of the turbine blade does indicate an adverse effect which necessitates a repair and/or replacement of the turbine blade.

Figure 1:
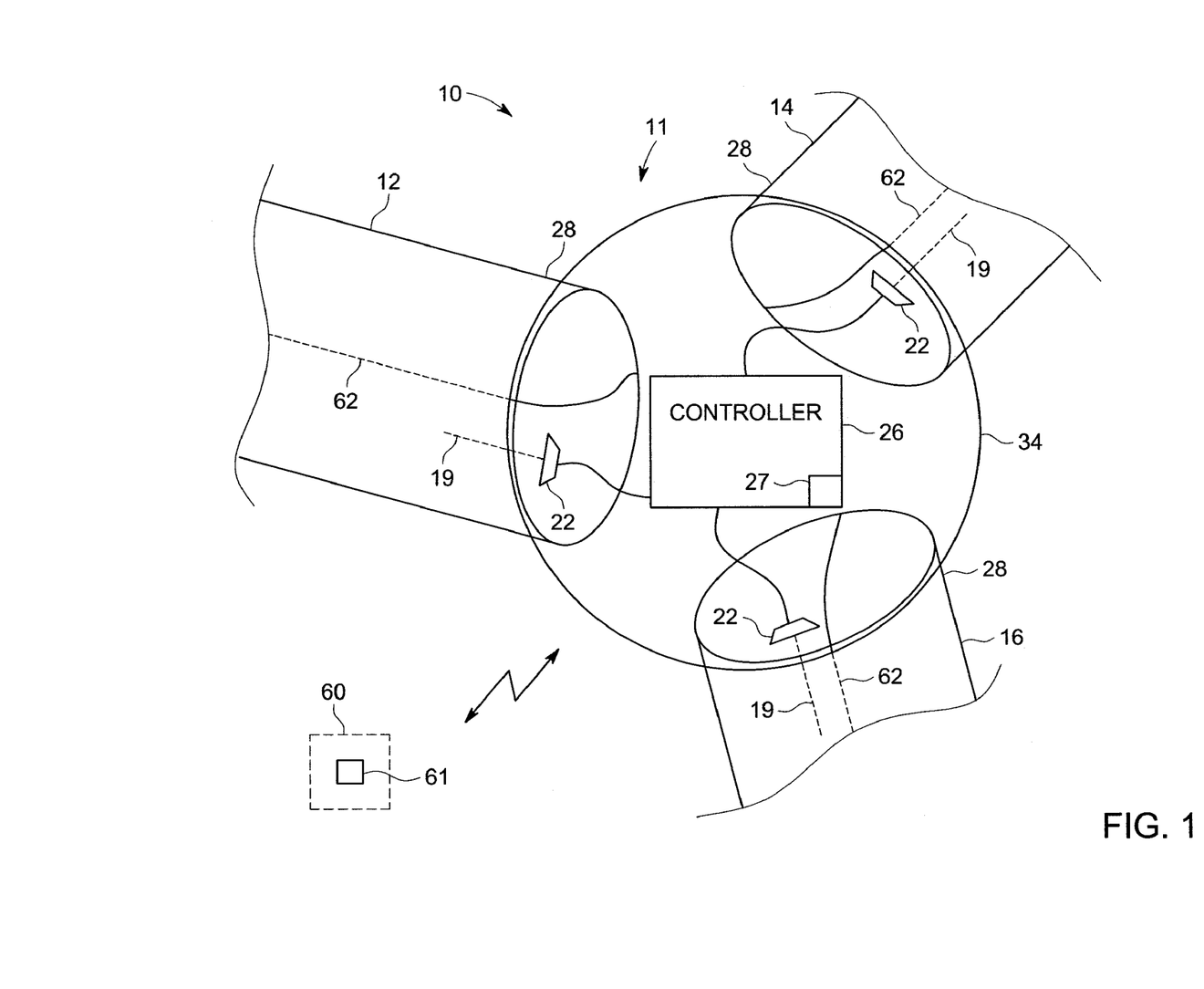
FIG. 1 is a partial cut-away view of an exemplary embodiment of a hub to connect a plurality of turbine blades within a system for estimating a condition of the turbine blades exposed to a lightning strike.
Figure 2:
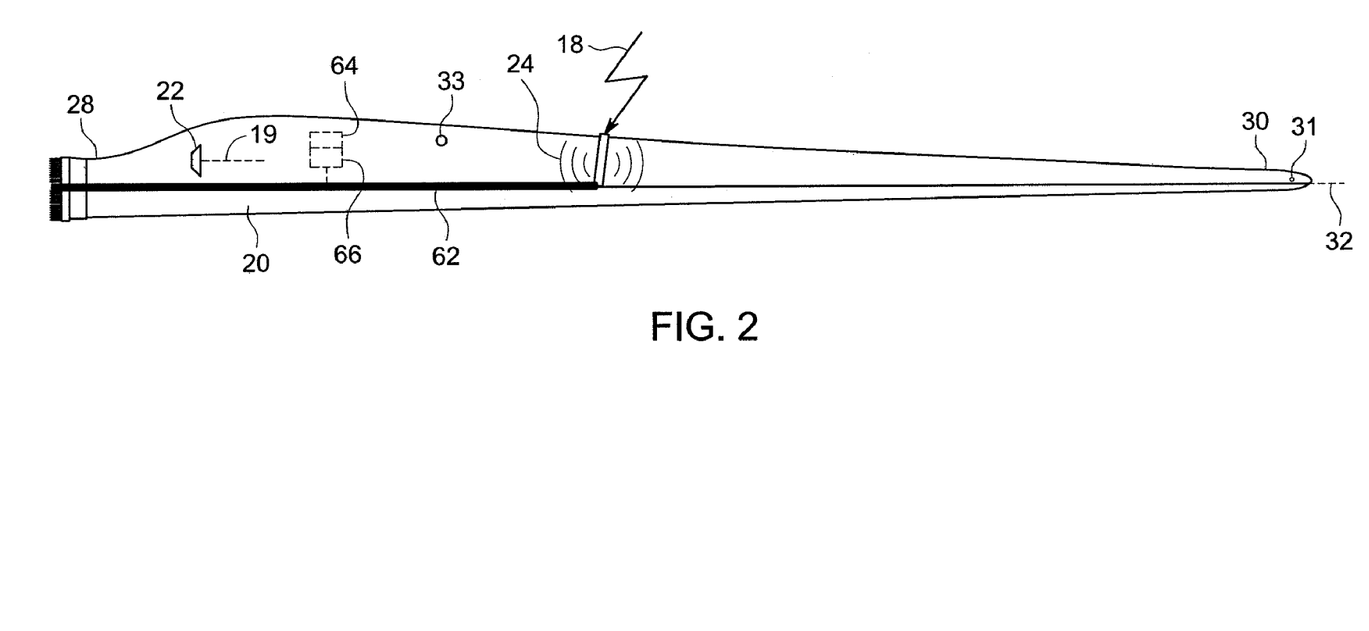
FIG. 2 is a partial cut-away side view of an exemplary embodiment of a turbine blade used within the system for estimating the condition of the turbine blades exposed to a lightning strike, as illustrated in FIG. 1.

FIGS. 1-2 illustrate an exemplary embodiment of a wind turbine system 11, which includes a plurality of non-conductive hollow structures, such as wind turbine blades 12,14,16 which respectively include a root 28 and a tip 30 at opposing ends along a longitudinal axis 32. Although FIG. 2 illustrates the blade 12, the other blades 14,16 within the wind turbine system 11 have a similar structure. The wind turbine blades 12,14,16 are individually connected to a hub 34 at the respective root 28 of each turbine blade 12,14,16, A partition 36 or bulkhead (FIGS. 4-6) is positioned near the root 28. As illustrated in FIG. 2, the blade 12 has an internal cavity 20 that may be hollow and which takes a predefined shape that extends from the root 28 to the tip 30. As further illustrated in FIG. 2, the blade 12 includes a lightning receptor 31 positioned at the tip 30 and a lightning receptor 33 positioned at an intermediate location between the root 28 and the tip 30. A conductor 62 passes within the internal cavity 20 of the blade 12 from the tip 30 to the root 28 and into the hub 34 (FIG. 1), to electrically connect the lightning receptor 31 to an earth ground (not shown) within the hub 34. In the event of a lightning strike to the lightning receptor 31, the resulting current flows from the lightning receptor 31, through the conductor 62 and to the earth ground within the hub 34. Although FIG. 2 illustrates an internal cavity 20 and conductor 62 of the turbine blade 12, the turbine blades 14,16 have a similar structure, and thus a similar internal cavity and conductor. Although FIG. 1 illustrates a wind turbine system 11 with three turbine blades 12,14,16, the embodiments of the present invention is not limited to this arrangement, and may be used with a wind turbine system having less or more than three blades, for example. Although FIGS. 1-2 illustrate a conductor 62 within the internal cavity 20, other configurations of lightning protection systems may be used, such as an external mesh or an external down-conduction system, for example.

FIGS. 1-2 illustrate an exemplary embodiment of a system 10 for estimating a condition of one or more of the wind turbine blades 12,14,16 of the wind turbine system 11, exposed to the lightning strike 18. As illustrated in FIG. 2, in the event of an unexpected circumstance, the lightning strike 18 passes through the internal cavity 20 of the turbine blade 12. The lightning strike 18 strikes the exterior surface of the blade 12, and creates a current arc through the internal cavity 20. The current arc rapidly heats the air within the internal cavity 20, which generates an acoustic wave 24 within the internal cavity 20. As illustrated in FIG. 2, the acoustic wave 24 may propagate in the longitudinal direction (i.e., parallel to the longitudinal axis 32) toward the root 28 and a secondary acoustic wave (not labeled) is generated which propagates to the tip 30. As illustrated in FIG. 2, the lightning strike 18 may occur at an intermediate location between the root 28 and the tip 30, or any location between the root 28 and the tip 30, and may or may not adversely affect the condition of the blade 12. For example, the lightning strike 18 may generate the acoustic wave 24 within the internal cavity 20 of the turbine blade 12, which in-turn may have no adverse effect on the condition of the turbine blade 12, and thus not require any repair/replacement of the turbine blade 12. However, in another example, the generated acoustic wave 24 within the internal cavity 20 may have an adverse effect on the condition of the turbine blade 12, and require inspection, repair and/or replacement to the exterior surface of the turbine blade 12.

As further illustrated in FIGS. 1-2, the system 10 includes a pressure transducer 22 or a pressure sensor, assigned to each turbine blade 12,14,16, which is either positioned within the hub 34 (FIG. 1) or within the respective root 28 of the turbine blade 12 (FIG. 2). The pressure transducer 22 includes a sensory axis 19 to define an incident direction of the acoustic wave 24 such that the acoustic wave 24 is detected by the pressure transducer 22. In an exemplary embodiment, the pressure transducer 22 may not detect the acoustic wave 24 if the acoustic wave 24 was incident at an angle orthogonal to the sensor axis 19, for example. As illustrated in FIGS. 1-2, the sensor axis 19 of the pressure transducer 22 is aligned along the respective longitudinal axis 32 of each blade 12,14, 16 toward the tip 30 (FIG. 1). Although FIG. 2 illustrates that the turbine blade 12 may include a pressure transducer 22 positioned within the root 28, and that the sensory axis 19 is aligned along the longitudinal axis 32 toward the tip 30, the turbine blades 14,16 may similarly include such a pressure transducer positioned within the root and including a sensory axis aligned along the longitudinal axis toward the tip. The pressure transducer 22 measures the pressure of the acoustic wave 24 generated within the internal cavity 20, due to the lightning strike 18 through the internal cavity 20 of the turbine blade 12. In an exemplary embodiment, the pressure transducer 22 is a microphone or a piezoelectric based sensor. In an additional exemplary embodiment, the pressure transducer 22 is an optical system including an optical transceiver which transmits an optical signal through an optical fiber to an optical pressure transducer, such as a mirror whose surface is deflected, in response to the incident acoustic wave. The deflected surface of the optical pressure transducer re-directs the reflected optical signal. The optical transceiver receives the deflected optical signal, and determines that the acoustic wave was incident on the optical pressure transducer, based on whether the optical signal has deflected by more than a predetermined deflection threshold. The optical transceiver may be a laser transceiver, for example. However, the pressure transducer may be any device capable of measuring the pressure of the acoustic wave 24 and generating an electric signal indicative of the measured pressure that is transmitted to a controller (discussed below). Although FIG. 2 illustrates an instance of a lightning strike 18 through the internal cavity 20 of the turbine blade 12, this is merely exemplary, and the system 10 may similarly estimate the condition of the turbine blades 14,16 resulting from a lightning strike through the respective internal cavity of the wind turbine blades 14,16, for example. Although FIGS. 1-2 illustrate that the system 10 is positioned within the hub 34, the system need not be positioned within the hub of the turbine system, and instead may be positioned within a tower or a nacelle of the turbine system, for example.

As further illustrated in FIG. 1, a controller 26 is positioned within the hub 34 and is coupled to each pressure transducer 22 that is assigned to the turbine blades 12,14,16. The controller 26 receives the electrical signal indicative of the measured pressure from each pressure transducer 22, in the event that one of the turbine blades 12,14,16 is struck by the lightning strike 18 and the resulting acoustic wave 24 is generated within the internal cavity 20. The controller 26 may process the condition of the turbine blade 12, based on the measured pressure received from the pressure transducer 22, as well as the predefined shape of the internal cavity 20 of the turbine blade 12. As previously discussed, the processed condition of the turbine blade need not indicate that any adverse effect to the turbine blade 12 has occurred due to the lightning strike 18. Although the embodiments of FIGS. 1-2 discuss an instance in which the acoustic wave 24 is generated from a lightning strike 18 through the internal cavity 20, the embodiments of the present invention are not limited to estimating a condition of the turbine blades as a result of these acoustic waves, and may include estimating the condition of the turbine blades based on an acoustic wave generated within the internal cavity 20 that is attributable to circumstances other than a lightning strike 18 through the internal cavity 20. For example, a manufacturing defect, crack or any structural anomaly in the turbine blade (either pre-existing or spontaneously formed) may cause an acoustic wave to be generated within the internal cavity 20, which may be measured to estimate the turbine blade condition. The memory 27 of the controller 26 may be pre-programmed with one or more thresholds for a measured parameter of the acoustic wave, which are assigned to a respective structural anomaly of the turbine blade. Such stored parameter thresholds may include one or more pressure thresholds and/or Mach number thresholds, to compare with a respective measured pressure and/or a measured Mach number of the acoustic wave. For example, the memory 27 of the controller 26 may store a pressure threshold of 1.1 atmospheres and a Mach number threshold of Mach 1 as indicative of a particular structural anomaly in the turbine blade. If the measured pressure received by the controller 26 exceeds the pressure threshold and/or the measured Mach number exceeds the Mach number threshold, the controller 26 may determine that the structural anomaly associated with the threshold is present in the turbine blade.

Figure 4:
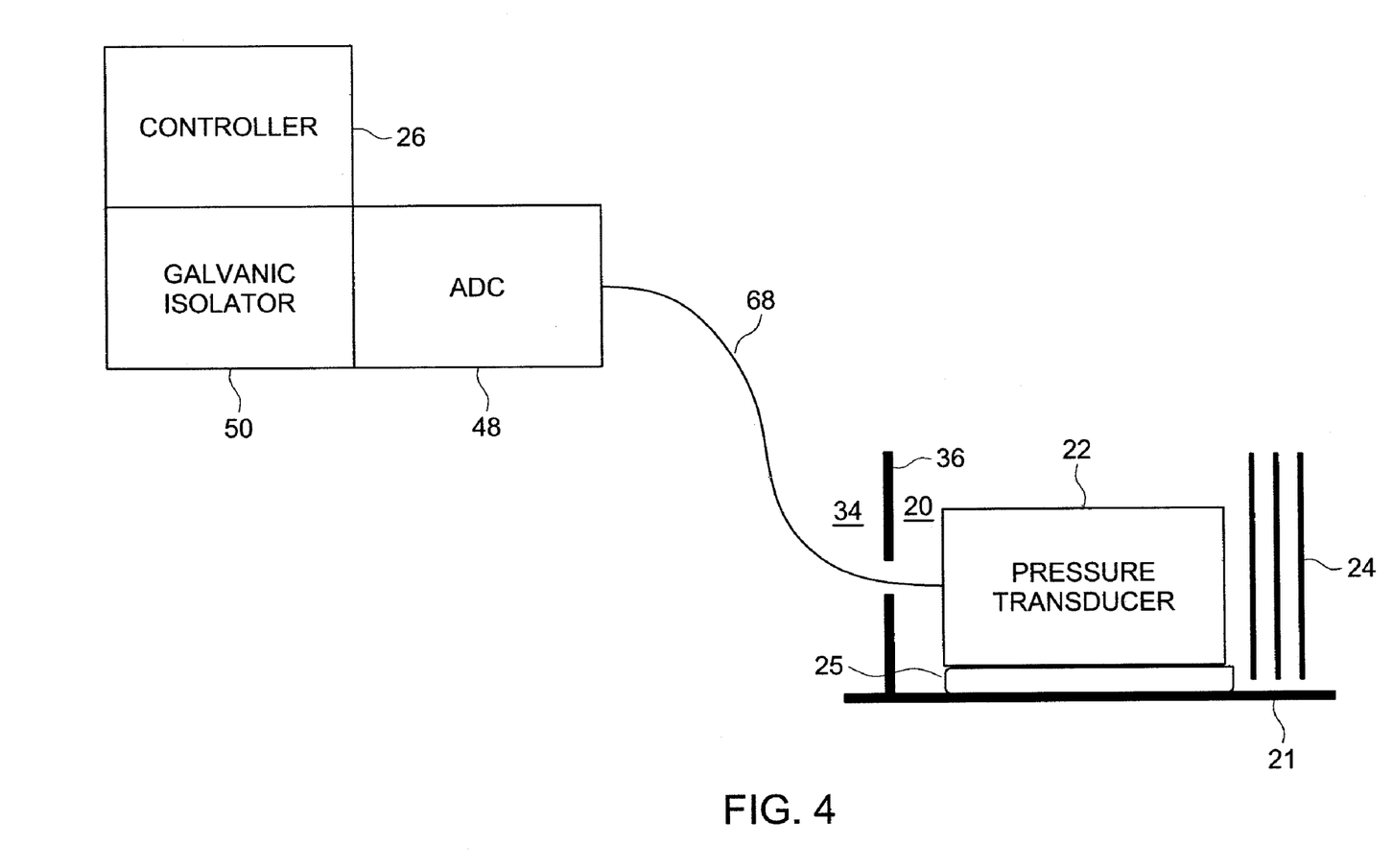
FIG. 4 is a schematic diagram of an exemplary embodiment of a connection arrangement for the system for estimating the condition of the turbine blades exposed to a lightning strike illustrated in FIG. 1.
Figure 6:
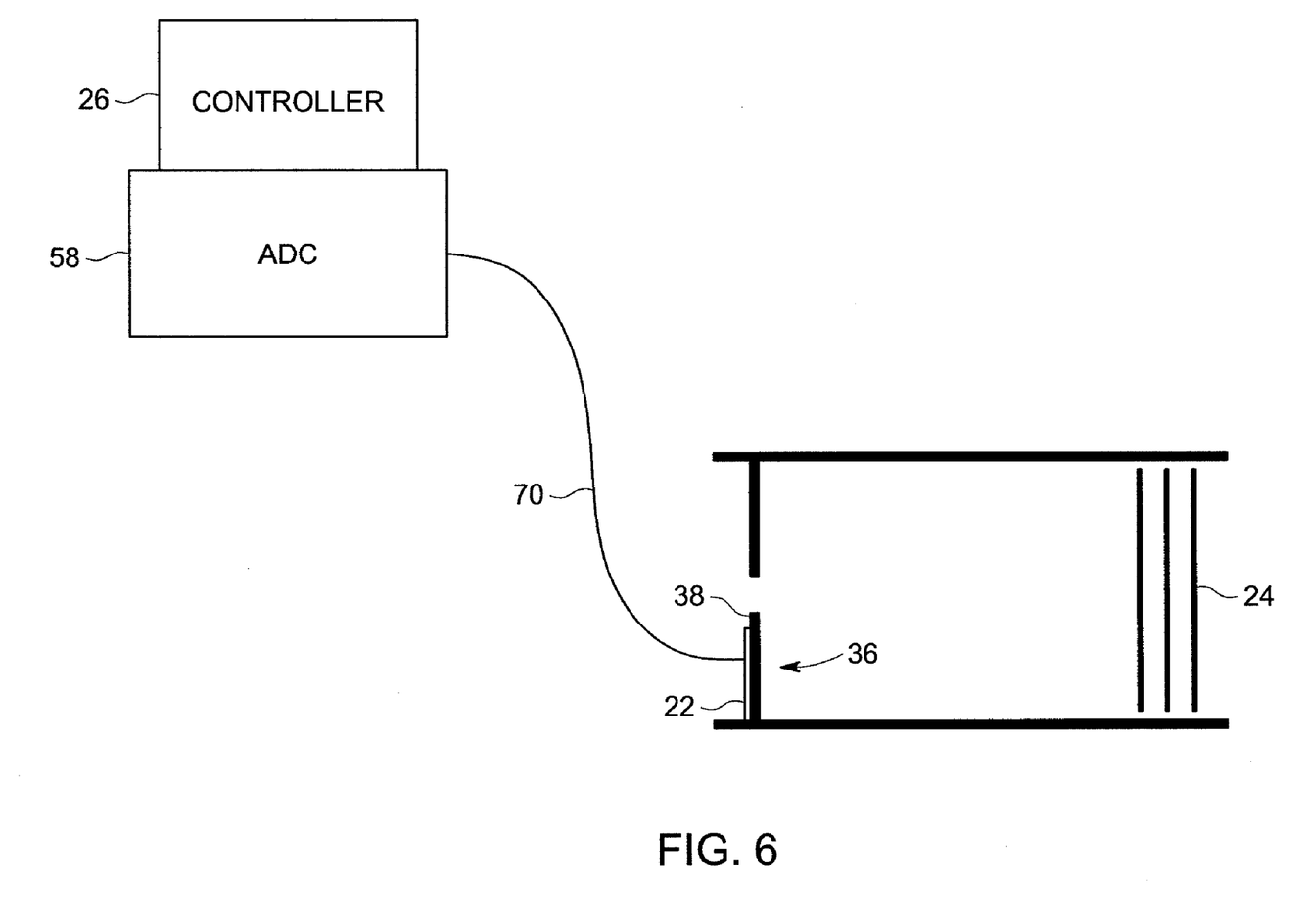
FIG. 6 is a schematic diagram of an exemplary embodiment of a connection arrangement for the system for estimating the condition of the turbine blades exposed to a lightning strike illustrated in FIG. 1.

As discussed above, the pressure transducer 22 may be positioned within the root 28 (FIG. 2) of the turbine blade 12, or may be positioned within the hub 34 (FIG. 1) of the system 10. As illustrated in FIG. 4, an exemplary embodiment of the system 10 is provided in which the pressure transducer 22 is positioned within the root 28, where the pressure transducer 22 is mounted to a surface 21 of the internal cavity 20, and may be mounted to the surface 21 using an acoustic isolator 25, for example, such that the measured pressure is unaffected by any vibrations of the surface 21, which are usually detected during normal operation of the wind turbine. As illustrated in FIG. 6, an exemplary embodiment is provided in which the pressure transducer 22 is positioned on the partition 36, and is either a strain gauge or an accelerometer that is mounted to a surface 38 of the partition 36. The strain gauge or accelerometer indirectly measures the pressure of the acoustic wave 24, by first measuring a strain or acceleration of the surface 38 of the partition 36, as the acoustic wave 24 propagates over the partition 36. The measured strain or measured acceleration is transmitted to the controller 26, which may convert the measured strain or measured acceleration into a pressure of the acoustic wave 24, or alternatively, the strain gauge or accelerometer may convert the measured strain/acceleration into the measured pressure, before transmitting the measured pressure to the controller 26. The controller 26 subsequently processes the condition of the turbine blade 12, based on the measured pressure of the acoustic wave 24.

Figure 3:
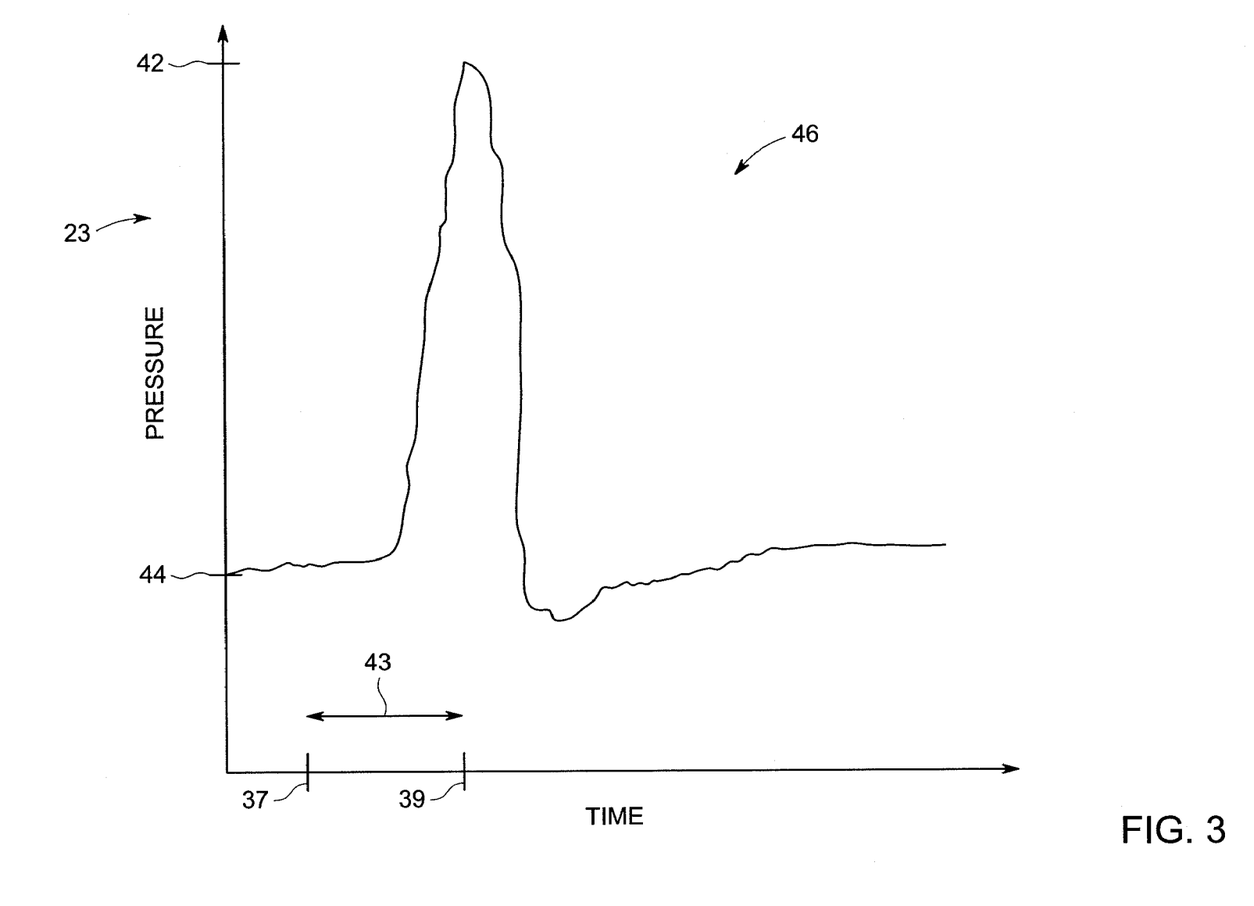
FIG. 3 is a plot of a measured pressure within the internal cavity of the turbine blade illustrated in FIG. 2 versus time, during a lightning strike through the internal cavity of the turbine blade.

As illustrated in FIG. 3, a plot is illustrated of the acoustic signature 46 of the pressure 23 measured by the pressure transducer 22 during the lightning strike 18 through the internal cavity 20, versus time. Prior to the lightning strike 18, the pressure 23 within the internal cavity 20 is at or around atmospheric pressure 44. Subsequent to the lightning strike 18, the pressure 23 rapidly increases from atmospheric pressure 44 to a peak pressure 42 at a peak time 39, and then rapidly decreases to a pressure below atmospheric pressure 44, before gradually oscillating back to atmospheric pressure 44.

In order to estimate the condition of the turbine blade 12 (or either of the other turbine blades 14,16) due to the lightning strike 18, the controller 26 includes a memory 27 to store one or more pressure threshold(s) indicative of a respective condition of the turbine blade 12. In an exemplary embodiment, the pressure threshold(s) are minimum pressure threshold(s), which the controller 26 uses to determine whether the peak pressure 42 from the measured pressure 23 is greater than minimum pressure threshold(s), and subsequently process the condition of the turbine blade 12 as corresponding to the stored blade condition for which the respective pressure threshold is exceeded by the peak pressure 42. The controller 26 compares the peak pressure 42 from the measured pressure 23 of the acoustic wave 24 with the stored pressure threshold (s), retrieves the stored condition corresponding to the peak pressure 42 from the measured pressure 23, and processes the condition of the turbine blade 12, as the stored condition corresponding to the peak pressure 42 from the measured pressure 23. For example, the memory 27 may store a first pressure threshold, a second pressure threshold and a third pressure threshold which respectively correlate to a first condition corresponding to no or negligible repair to the turbine blade, a second condition corresponding to a repair to the turbine blade, and a third condition corresponding to a replacement of the turbine blade. In this example, the first pressure threshold is less than the second pressure threshold, and the second pressure threshold is less than the third pressure threshold. In the example, if the controller 26 determines that the peak pressure 42 is greater than the second pressure threshold but less than the third pressure threshold, the controller 26 may process that the condition of the turbine blade 12 corresponds to the second condition requiring a repair to the turbine blade 12. The condition of the turbine blade 12 (and the stored condition within the memory 27) may be expressed in terms of a monetary, priority, or value units of any required repair or replacement to the turbine blade 12, if the condition of the turbine blade 12 has been adversely impacted by the lightning strike 18 and the acoustic wave 24. Alternatively, the condition of the turbine blade 12 (and the stored condition within the memory 27) may be expressed in terms of the work units of any required repair or replacement (e.g., man-hour units) to repair or replace the turbine blade 12, if the condition of the turbine blade 12 has been adversely impacted by the lightning strike 18 and the acoustic wave 24. As previously discussed, the controller 26 may determine that the condition of the turbine blade 12 has not been adversely impacted by the lightning strike 18 and the acoustic wave 24, in which case no such monetary/work units of a repair or a replacement would be conveyed, as no such repair or replacement would be necessary to repair the condition of the turbine blade. As appreciated by one of skill in the art, for a particular turbine blade design, one or more pressure thresholds may be measured within the internal cavity of the turbine blade, and correlated to a respective condition of the turbine blade. The one or more pressure thresholds are subsequently stored into the memory 27 of the controller 26.

The embodiments of the present invention is not limited to the controller 26 comparing the peak pressure 42 from the measured pressure 23 of the acoustic wave 24 to one or more stored pressure threshold(s) and its corresponding rate of change. In an exemplary embodiment of the present invention, the pressure transducer 22 measures the acoustic signature 46 of the acoustic wave 24 and the controller 26 receives the acoustic signature 46 from the pressure transducer 22. The memory 27 stores one or more predetermined signature(s) indicative of a respective condition of the turbine blade 12. The controller 26 compares the acoustic signature 46 of the acoustic wave 24 with the one or more predetermined signature(s), retrieves the stored condition corresponding to the acoustic signature 46, and subsequently processes the condition of the turbine blade 12, based on the stored condition of the turbine blade 12 which corresponds to the acoustic signature 46.

As illustrated in FIG. 1, the pressure transducer 22 for each turbine blade 12,14,16 is coupled to the controller 26. Although FIG. 1 illustrates that the pressure transducer 22 is coupled to the controller 26 via. a wired connection, this is merely one of several possible connection arrangements used to couple the pressure transducer 22 to the controller 26, and one or more connection components may be utilized, as discussed below. The embodiment illustrated in FIG. 4 provides that the pressure transducer 22 is coupled to the controller 26 with a wired connection (i.e., a cable 68) from the pressure transducer 22 to an analog to digital converter (ADC) 48, which converts the measured pressure 23 from an analog signal to a digital signal, to be processed by the controller 26. Although FIG. 4 illustrates an ADC 48, any conditioning electronics component may be utilized, to convert the measured pressure 23 signal into an acceptable form for processing by the controller 26, such as a piezoelectric element. As further illustrated in FIG. 4, a galvanic isolator 50 is also provided, to couple the ADC 48 to the controller 26 and to prevent the passage or communication of lightning current between the pressure transducer 22 and the controller 26, as well as between the ADC 48 and the controller 26, as appreciated by one of skill in the art.

Figure 5:
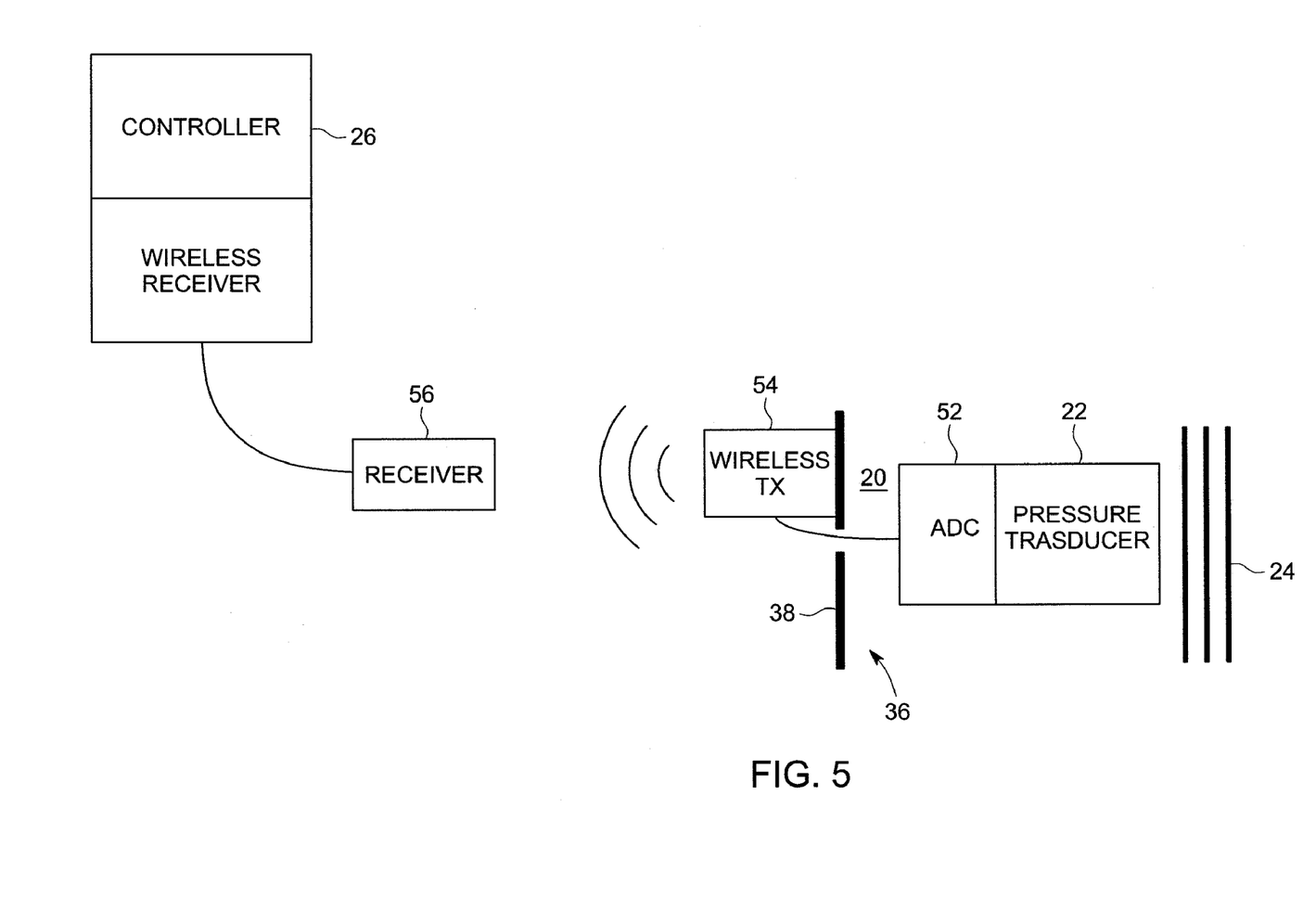
FIG. 5 is a schematic diagram of an exemplary embodiment of a connection arrangement for the system for estimating the condition of the turbine blades exposed to a lightning strike illustrated in FIG. 1.

The embodiment illustrated in FIG. 5 provides that the pressure transducer 22 is coupled to the controller 26 using an ADC 52 connected to the pressure transducer 22, which converts the measured pressure 23 from an analog signal to a digital signal. As further illustrated in FIG. 5, a wireless transmitter 54 is connected to the ADC 52, to wirelessly transmit the digital signal of the measured pressure 23, and a wireless receiver 56 is connected to the controller 26, to receive the digital signal from the wireless transmitter 54 and transmit the digital signal to the controller 26, to be processed. As illustrated in FIG. 5, the wireless transmitter 54 is mounted to a surface 38 of the partition 36, and the wireless transmission is either a radio frequency (RF) or an optical signal, since the partition 36 is not obstructing the signal to the wireless receiver 56. However, if the wireless transmitter were mounted to the partition 36, such that the partition 36 was obstructing the signal to the wireless receiver 56, the wireless transmission would be over an RF frequency.

The embodiment illustrated in FIG. 6 provides a communication arrangement between the pressure transducer 22, which is either a strain gauge or an accelerometer, mounted to the surface 38 of the partition 36, and the controller 26. As illustrated in FIG. 6, the pressure transducer 22 (strain gauge or accelerometer) is coupled to the controller 26 through the ADC 58 that is connected to the controller 26, to convert the measured pressure 23 from an analog signal to a digital signal for processing by the controller 26. In addition, a wired connection, such as a cable 70, for example, is provided to connect the pressure transducer 22 (i.e., strain gauge or accelerometer) to the ADC 58, to transmit the measured strain/acceleration to the ADC 58. Either the ADC 58 or an additional component connected to the ADC 58 may convert the measured strain/acceleration into the measured pressure of the acoustic wave 24 within the internal cavity 20, before the ADC 58 converts the measured pressure from the analog signal to the digital signal, and sends the digital signal to the controller 26 for processing. Alternatively, the strain gauge/accelerometer may convert the measured strain/acceleration into the measured pressure, prior to the wired transmission to the ADC 58 through the cable 70.

As illustrated in FIG. 1, in an exemplary embodiment of the present invention, the controller 26 is positioned within the hub 34, and once the controller 26 determines that the measured pressure 23 from any of the pressure transducers 22 among the turbine blades 12,14,16 exceeds the pressure threshold(s), and if the controller 26 determines that the condition of the turbine blade is indicative of an adverse effect which necessitates a repair and/or replacement to the blade, the controller 26 transmits a condition signal to a remote location 60 with a remote controller 61. Upon receiving the condition signal, the remote controller 61 may initiate a response action, such as dispatching a third party to repair and/or inspect the turbine blade, for example. In another example, the controller 26 may initiate the response action, based on the determination that the processed condition of the turbine blade is indicative of an adverse effect to the turbine blade which necessitates a repair and/or replacement to the turbine blade. In an exemplary embodiment, the controller 61 positioned at the remote location 60 receives the measured pressure 23 from each pressure transducer 22 at regular time intervals and compares the measured pressure from each pressure transducer 22 with the stored minimum pressure threshold(s), in a similar manner as discussed above with regard to the controller 26, to process the condition of the turbine blades 12,14,16.

Figure 7:
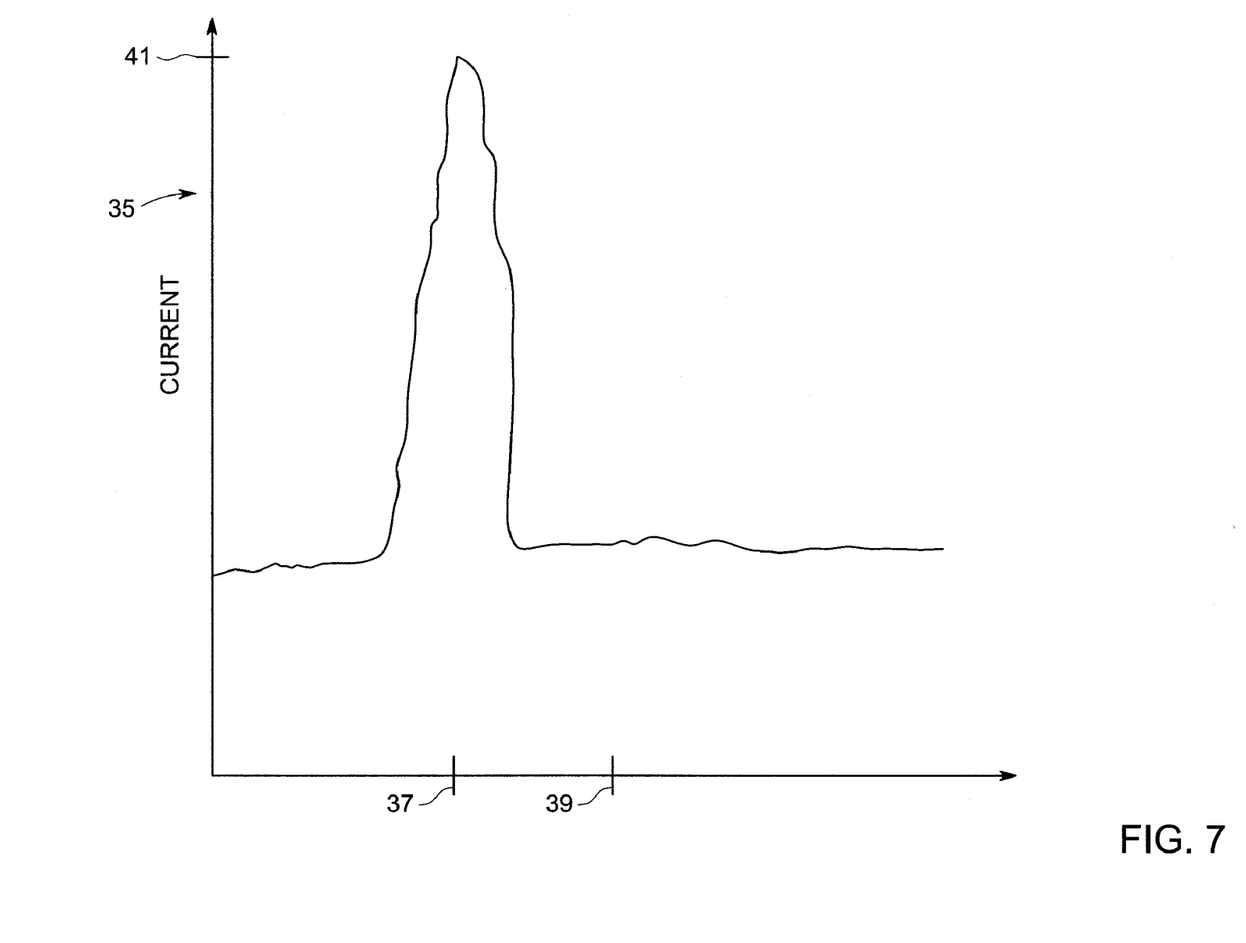
FIG. 7 is a plot of a measured current within the internal cavity of the turbine blade illustrated in FIG. 2 versus time, during a lightning strike through the internal cavity of the turbine blade.

As discussed above, the controller 26 processes the condition of the turbine blade 12, based on the comparison of the measured pressure 23 with the stored minimum pressure threshold(s), and the retrieved condition from the memory 27 corresponding to the measured pressure 23. As discussed above, the conductor 62 extends from the tip 30 to the root 28 of the turbine blade 12 and into the hub 34, to electrically couple the tip receptor 31 to the earth ground (not shown). As illustrated in FIG. 2, in addition to the pressure transducer 22, the system 10 may include a sensor 64 coupled to the conductor 62 (through a galvanic isolator 66) within each wind turbine blade 12,14,16, to measure a current 35 (i.e., current sensor) within the conductor 62. The sensor 64 is coupled to the controller 26, and based on the lightning strike 18 through the internal cavity 20, the sensor 64 measures the current 35 within the conductor 62 and transmits the measured current to the controller 26. Alternatively, rather than measuring the current 35 within the conductor 62, the sensor 64 may be configured to measure a magnetic field (i.e., field sensor) induced by the change in the current 35 through the conductor 62, due to the lightning strike 18. The sensor 64 is separated from the conductor 62 by an appropriate distance, such that the measured magnetic field can be correlated to the current 35 through the conductor 62. The sensor 64 transmits the measured magnetic field to the controller 26. A table of one or more magnetic field threshold(s) and the associated current through the conductor 62, may be stored in the memory 27 of the controller 26, such that the controller 26 compares the received measured magnetic field with the magnetic field threshold(s), to determine the current 35 through the conductor 62. FIG. 7 illustrates a plot of the measured current 35 attributable to the lightning strike 18 through the conductor 62. As illustrated in FIG. 7, the measured current 35 rises to a peak current 41 at a peak time 37 and subsequently lowers to an initial steady state current value. The controller 26 receives the measured current 35 from the sensor 64, and determines whether the measured current 35 is indicative of a lightning strike 18 through the internal cavity 20, based on the magnitude of the peak current 41 (i.e., determines if the peak current is greater than a minimum current threshold indicative of a lightning strike).

Based on this determination, the controller 26 transmits a signal to the pressure transducer 22, to initiate a measurement of the pressure within the internal cavity 20. In an exemplary embodiment, the controller 26 may signal the pressure transducer 22 to initiate the pressure measurement at a high bandwidth (e.g., ~1 million samples per second) over a short period (e.g., a few seconds) to capture the pressure 23 of the generated acoustic wave 24, subsequent to the lightning strike 18. As illustrated in FIGS. 3 and 7, the current 35 rises to the peak current 41 at the peak time 37, while the pressure 23 rises to the peak pressure 42 at the peak time 39, which occurs after the peak time 37 of the peak current 41. The peak time difference 43 between the peak time 37 of the peak current 41 and the peak time 39 of the peak pressure 42 permits the controller 26 to transmit the signal to the pressure transducer 22, to initiate the high bandwidth pressure measurement, before the acoustic wave 24 reaches the pressure transducer 22. The embodiments of the present invention are not limited to this arrangement, however, and alternatively, the pressure transducer 22 may continuously measure the pressure 23, and transmit the pressure 23 to the controller 26, or a peak detect and hold circuit may be utilized, which stores the peak pressure 42 of the pressure 35, and the controller 26 checks the stored peak current value at a periodic time interval.

The embodiments of the present invention are not limited to an arrangement in which the processed condition (and/or the monitoring of the blades for a lightning strike) is based on the measured pressure 23, and may be based on additional parameters. In an exemplary embodiment of the system 10, the memory 27 of the controller 26 stores one or more current threshold(s), such as one or more minimum current threshold(s), along the conductor 62 which is indicative of the lightning strike 18 through the internal cavity 20, and may also be indicative of a respective condition of the turbine blade due to the lightning strike 18. The controller 26 monitors the condition of the turbine blades 12,14,16 due to the lightning strike 18, by comparing the measured current 35 from the sensor 64 with the stored minimum current threshold(s), as well as comparing the measured pressure 23 with the minimum pressure threshold(s), which are also indicative of the lightning strike 18. As appreciated by one of skill in the art, the sensor 64 detects the current through the conductor 62 before the pressure transducer 22 measures the pressure of the acoustic wave 24, and thus the controller 26 may be pre-programmed to adjust for this delay in the comparisons of the measured current with the current threshold(s) and the measured pressure with the pressure threshold(s). As discussed above, the embodiment of the present invention need not include the sensor 64, and thus the controller 26 may monitor the blades 12,14,16 and/or process the condition of the blades 12,14,16 based on the comparison of the measured pressure 23 with the minimum pressure threshold(s).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A system for estimating a condition of a non-conductive hollow structure exposed to a lightning strike, the structure having an internal cavity, said system comprising:
   a pressure transducer to measure a rapid change in pressure caused by an acoustic wave generated within the internal cavity due to the lightning strike; and
   a controller coupled to the pressure transducer, to receive the measured pressure from the pressure transducer; said controller configured to process the condition of the structure, based on the measured pressure.

2. The system of claim 1, wherein said structure is one of a wind turbine blade or an aircraft structure.

3. The system of claim 1, wherein said structure is a turbine blade, wherein said turbine blade includes a root and a tip at opposite ends along a longitudinal axis, wherein said pressure transducer is positioned within the internal cavity of the turbine blade, and wherein said pressure transducer has a sensory axis to define an incident direction of the wave to be detected by the pressure transducer, said pressure transducer is aligned such that the sensory axis is oriented along the longitudinal axis.

4. The system of claim 3, wherein said pressure transducer is positioned in the internal cavity at the blade root, wherein said sensory axis is oriented at the tip along the longitudinal axis, and wherein said acoustic wave propagates within the internal cavity along the longitudinal axis, toward the root, due to the lightning strike or electric arc through the internal cavity.

5. The system of claim 3, wherein said pressure transducer is mounted to a surface of the internal cavity, within the root.

6. The system of claim 3, wherein said turbine blade is attached to a hub at the blade root; said system further includes a partition positioned between the blade root and the hub, to separate the blade root and the hub; said pressure transducer is mounted to a surface of the partition;
   and wherein said pressure transducer is one of a strain gauge or an accelerometer, to measure a respective strain or an acceleration of the partition surface and to convert the respective strain or acceleration into the measured pressure.

7. The system of claim 6, wherein said pressure transducer is coupled to the controller based on:
   an analog to digital converter (ADC) connected to the controller, said ADC configured to convert the measured pressure from an analog signal to a digital signal for processing by the controller; and
   a wired connection from one of the strain gauge or the accelerometer to the ADC, to transmit the measured pressure to the ADC.

8. The system of claim 1, wherein said controller includes a memory configured to store at least one pressure threshold indicative of a respective condition of the non-conductive hollow structure; wherein said controller is configured to compare a peak pressure from the measured pressure of the wave with said at least one pressure threshold, to process the condition, based on the stored condition of the non-conductive hollow structure corresponding to the peak pressure.

9. The system of claim 8, wherein said memory further stores additional pressure thresholds indicative of respective additional conditions of the structure; wherein said controller is configured to compare the peak pressure From the measured pressure with said at least one pressure threshold and said additional pressure thresholds, to process the condition, based on the stored condition of the structure corresponding to the peak pressure.

10. The system of claim 9, wherein the structure is a wind turbine blade.

11. The system of claim 1, wherein said structure is a wind turbine blade, wherein said pressure transducer is configured to measure an acoustic signature of the acoustic wave and wherein said controller is configured to receive the acoustic signature from the pressure transducer; wherein said controller includes a memory configured to store at least one predetermined signature indicative of a respective condition of the turbine blade; wherein said controller is configured to compare the acoustic signature of the acoustic wave with said at least one predetermined signature, to estimate the condition, based on the stored condition of the turbine blade corresponding to the acoustic signature.

12. The system of claim 1, wherein said pressure transducer is coupled to the controller based on:
   a wired connection from the pressure transducer to an analog to digital converter (ADC), said ADC configured to convert the measured pressure from an analog signal to a digital signal, said digital signal to be processed by the controller, and
   a galvanic isolator to electrically couple the ADC to the controller and to prevent a flow of current between the pressure transducer and the controller.

13. The system of claim 1, wherein said pressure transducer is coupled to the controller based on:
   an analog to digital converter (ADC) connected to the pressure transducer, to convert the measured pressure from an analog signal to a digital signal;
   a wireless transmitter connected to the ADC to wirelessly transmit the digital signal of the measured pressure; and
   a wireless receiver connected to the controller, configured to receive the digital signal and transmit the digital signal to the controller for processing.

14. The system of claim 13, wherein said structure is a wind turbine blade, wherein said turbine blade includes a root and a tip at opposite ends along a longitudinal axis, wherein said turbine blade is attached to a hub at the blade root; wherein said system further includes a partition positioned between the blade root and the hub, to separate the blade root and the hub; said wireless transmitter is mounted to a surface of the partition within the hub, and wherein said wireless transmission is one of a radio frequency (RF) or an optical signal.

15. A system for monitoring a condition of a plurality of wind turbine blades exposed to a lightning strike affecting at least one of the turbine blades, each turbine blade having a root and a tip at opposing ends along a longitudinal axis, said turbine blades connected to a hub at the respective root, said system comprising:
   a pressure transducer configured to measure a rapid change in pressure caused by an acoustic wave generated within each internal cavity due to the lightning strike;
   a controller coupled to each pressure transducer, to receive the measured pressure from each pressure transducer; said controller configured to monitor the condition of each turbine blade, based on comparing the measured pressure from each turbine blade with a pressure threshold indicative of the lightning strike.

16. The system of claim 15, wherein said controller is positioned within the hub; wherein said controller is configured to transmit a condition signal to a remote controller positioned at a remote location from the wind turbine blades, based on the comparison of the measured pressure with the pressure threshold.

17. The system of claim 15, further comprising:
   a respective conductor configured to extend from the tip to the root of each wind turbine blade, said conductor configured to pass a current attributed to the lightning strike;
   a current sensor coupled to the conductor within each wind turbine blade, said current sensor coupled to the controller;
   wherein said current sensor is configured to measure the current within the conductor; said current sensor is further configured to transmit the measured current to the controller;
   wherein said controller is configured to transmit a signal to the pressure transducer, to initiate a pressure measurement within the internal cavity, based on the measured current.

18. A system for estimating a condition of a non-conductive hollow structure exposed to a lightning strike, said structure having an internal cavity, said system comprising:
   a pressure transducer to measure a rapid change in pressure caused by an acoustic wave generated within the internal cavity due to the lightning strike;

a conductor to extend along a longitudinal axis of the structure, said conductor configured to pass a current attributable to the lightning strike;

a current sensor coupled to the conductor, said current sensor configured to measure the current within the conductor;

a controller coupled to the pressure transducer and the current sensor, to receive the measured pressure from the pressure transducer and the measured current from the current sensor; said controller configured to process the condition of the structure, based on the measured pressure and the measured current.

19. The system of claim 18, wherein said structure is a wind turbine blade, wherein said turbine blade includes a root and a tip at opposite ends along the longitudinal axis, wherein said pressure transducer is positioned within the internal cavity of the turbine blade, and wherein said pressure transducer has a sensory axis to define an incident direction of the wave to be detected by the pressure transducer, said pressure transducer is aligned such that the sensor axis is oriented along the longitudinal axis.

20. The system of claim 19, wherein said pressure transducer is positioned in the blade root, wherein said sensory axis is oriented at the tip along the longitudinal axis, and wherein said acoustic wave propagates within the internal cavity, toward the root based on the lightning strike through the internal cavity.

* * * * *